United States Patent

White

[11] Patent Number: 5,273,391
[45] Date of Patent: Dec. 28, 1993

[54] BOW WINCH STAND

[75] Inventor: Ronald O. White, Tullahoma, Tenn.

[73] Assignee: EZ Loader Boat Trailers, Inc., Spokane, Wash.

[21] Appl. No.: 935,924

[22] Filed: Aug. 27, 1992

[51] Int. Cl.⁵ .................................................. B60P 3/10
[52] U.S. Cl. ................................. 414/559; 280/414.1
[58] Field of Search .............................. 414/529–536, 414/559; 280/414.1; 114/344

[56] References Cited

U.S. PATENT DOCUMENTS

| | | | |
|---|---|---|---|
| 3,210,049 | 10/1965 | Holsclaw | 414/559 X |
| 3,303,951 | 2/1967 | Baldwin | 414/559 |
| 3,797,681 | 3/1974 | Brettrager | 414/559 |
| 3,848,892 | 11/1974 | Reder | 280/414.1 |
| 4,641,598 | 2/1987 | Hodges | 114/344 |
| 4,641,851 | 2/1987 | Knies | 280/414.1 |
| 4,684,145 | 8/1987 | Tingley | 280/414.1 |
| 4,687,219 | 8/1987 | Rendzio | 280/414.1 |
| 4,802,685 | 2/1989 | Godbersen | 414/559 X |
| 4,974,865 | 12/1990 | Capps | 280/414.1 |
| 5,010,933 | 4/1991 | Doyle | 414/559 X |
| 5,064,336 | 11/1991 | Godbersen | 414/559 |
| 5,152,657 | 10/1992 | Kehne | 280/414.1 X |
| 5,165,706 | 11/1992 | Ford | 280/414.1 |

FOREIGN PATENT DOCUMENTS 1425470 12/1965 France ............................ 280/414.1

*Primary Examiner*—David A. Bucci
*Attorney, Agent, or Firm*—Wall and Roehrig

[57] ABSTRACT

A bow stand for a boat trailer has a swingable bow arm assembly pivotally mounted on the bow stand post or column. A base plate permits mounting on the trailer tongue and a winch plate on the top of the post positions the boat winch above the base plate. The bow arm assembly is mounted on a transverse pivot to the post and carries a bow stop, e.g. a bow roller, at its free end. A spring yieldably urges the bow arm assembly to its normal raised position where the stop limits forward movement of the boat on the trailer. The spring permits the bow stop to deflect downward during boat launch to prevent the boat from hanging up on the bow stop when the boat is released from the trailer.

7 Claims, 2 Drawing Sheets

BOW WINCH STAND

BACKGROUND OF THE INVENTION

This invention relates in general to trailers and, in particular, to an improved cargo stop for a trailer to limit the forward movement of cargo carried on the trailer.

More specifically, but without restriction to the particular use which is shown and described as a preferred embodiment of the invention, this invention relates to an improved bow stop for a boat trailer. The bow stop, against which a boat is held during transit on the trailer to limit its forward movement, is pivotal in the direction the boat moves during launching from the trailer. This pivotal movement relieves the pressure force applied to a bow stand during boat launching, and minimizes the possibility of damage to the boat, or accessories such as trolling motors fixed to the bow, which can occur during boat launching.

As is known, to launch a trailered boat the trailer is backed into the water to a predetermined depth whereupon the boat can be launched from the trailer into the water. When the aft or stern portion of the boat floats up from its resting position on the trailer, the loading forces on the trailer change. The forward portion or bow of the boat exerts an increased pressure on the bow stand, as the stern portion of the boat is pivoted upwardly from its resting place on the trailer. This movement of the boat, upon being floated from the trailer, increases the force applied by the boat against the bow stand and the bow stop.

As launching continues, the bow of the boat is moved downwardly against the bow stop as the boat is moved off the trailer. Boats having accessories, such as a trolling motor fixed to the bow, are particularly susceptible to having the trolling motor, or its bow attachment structure, hung-up on the bow stop as the boat is launched from the trailer. Because of the forces applied to such structure during launching, the trolling motor and the trolling motor bow attachment structure, or the bow of the boat itself, can be subjected to damage. Accordingly, the present invention permits the bow stop to move with the boat during launching. In the event a boat accessory such as the trolling motor or its attachment structure becomes hung-up on the bow stop, the bow stop will pivot with the movement of the boat so that the interfering structure will be able to move with and over the stop to minimize the possibility of any damage.

SUMMARY OF THE INVENTION

It is, therefore, an object of this invention to improve cargo stops for use on trailers. Another object of this invention is to permit a stop, against which cargo is positioned for limiting its forward movement on a trailer, to move with the cargo during unloading for preventing damage to the cargo carried on the trailer.

Still another object of this invention is to improve bow stands for boat trailers by permitting the bow stop, against which a boat is carried on the trailer to limit its forward movement, by providing for movement of the bow stop with the boat during launching to prevent damage to the boat or its accessories.

These and other objects are attained in accordance with the present invention wherein there is provided a boat trailer bow stand having a pivotal bow stop such that the bow stop functions to provide a stop for limiting the forward movement of a boat carried on the trailer, but which will pivot with the boat upon launching to facilitate the unobstructed movement of the boat off the trailer.

This bow stand has a post member which includes a base plate that mounts onto the trailer tongue and a winch support plate disposed above the base plate, with a winch being mounted on the winch support plate. A bow arm assembly, e.g. formed of a pair of generally J-shaped bow arms members, is pivotally mounted, at a pivot end thereof, onto the post member so that a free end of the bow arm assembly is swingably deflectable from a normal, raised position to a lowered position. A spring or equivalent resilient member urges the bow arm assembly to its raised position, but yields under forces that accompany the release of the boat from the trailer. A bow stop mounted at the free end of the bow arm assembly limits the forward movement of the boat on the trailer when the bow arm assembly limits the forward movement of the boat on the trailer when the bow arm assembly is raised. During boat launch, the spring and pivoted bow arm assembly permits the bow stop to swing down to prevent the boat from hanging up when the boat is released from the trailer.

DESCRIPTION OF THE DRAWINGS

Further objects of the invention together with additional features contributing thereto and advantages occurring therefrom will be apparent from the following description of a preferred embodiment of the invention which is shown in the accompanying drawings with like reference numerals indicating corresponding parts throughout, wherein.

DETAILED DESCRIPTION OF A PREFERRED EMBODIMENT

Figure 1:
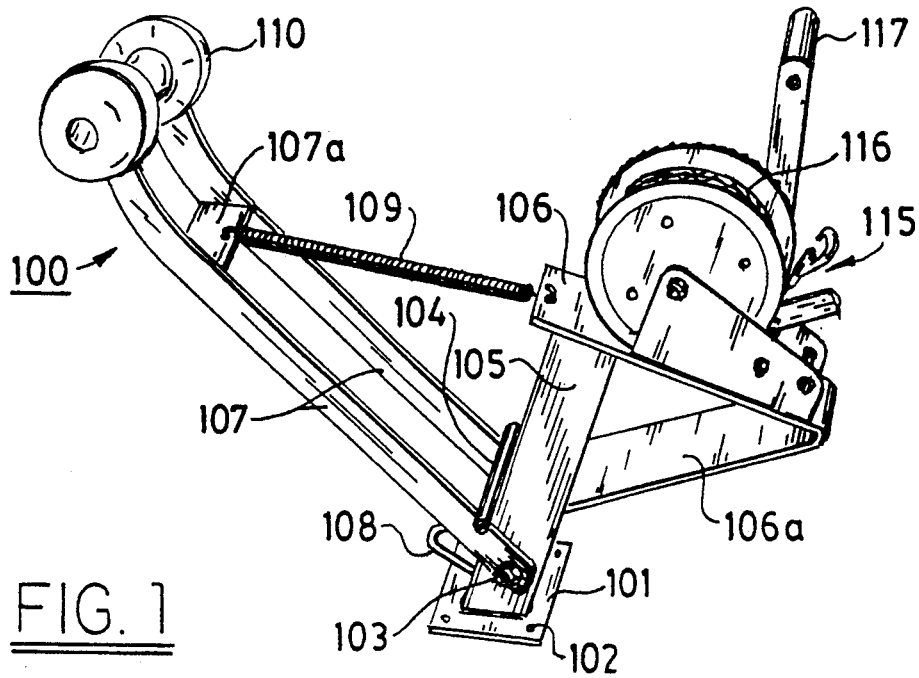
FIG. 1 is a perspective view of the bow stand illustrating the bow stop in a raised position such as occurs when providing a stop for limiting the forward movement of a boat on a trailer.
Figure 3:
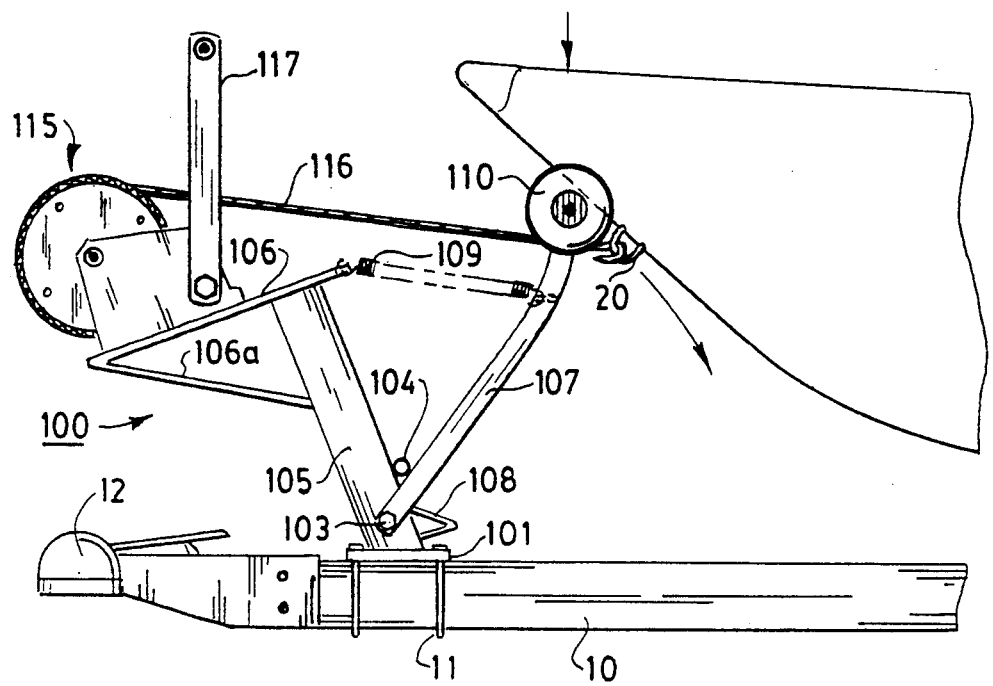
FIG. 3 is a side elevation of a bow stand mounted on a trailer tongue and engaging a boat in a position wherein the bow stop functions to secure the boat against forward movement on the trailer.

Referring now to FIGS. 1 and 3, a bow stand 100 includes a base plate 101 having holes 102 formed therein for securing the bow stand to a portion of a boat trailer. The base plate, and thereby the bow stand, are usually secured to the tongue portion 10 of a trailer by "U" bolts 11.

The bow stand 100 is thereby adjustable along the trailer tongue 10 so that a bow stop 110 is positioned to engage a boat at a predetermined position on the trailer to insure proper weight distribution on the coupling 12 whereby the trailer is connected to a towing vehicle. A retaining bracket 108 is welded to a column 105 near the bow stand base plate 101 for providing a fastening point for a safety chain to extend from the retaining bracket 108 to a suitable securing point on the boat, such as a bow eye 20.

The column member 105 is secured to the base plate 101, as by welding, and is preferably positioned at an angle extending forwardly relative to the trailer tongue 10. A winch base plate 106 is secured, preferably by welding, to the top of the column 105 providing a support to which a crank operated winch 115 may be secured. The winch base plate 106 extends from the column 105 and is bent to provide a support portion 106a.

The end of the support or brace portion 106a is secured to the column 105, as by welding, to brace the winch 115 supported thereon. The winch 115 is secured to the winch base plate 106 in a position such that a cable 116 carried thereby may freely move onto or off from the winch 115 when loading or launching a boat. The winch 115 may be of any type suitable for this purpose, as is known to those skilled in the art, whether the winch is hand-operated by means of a crank 117, as illustrated, or driven by a power assist (not shown).

A bow arm assembly includes a pair of pivotal bow arms 107 that are pivotally connected at one end to the column 105 by means of a pivot connection 103 comprising a bolt and sleeve suitably connecting the bow arms 107 for swinging movement relative to the column 105. The bow arms 107 are somewhat J-shaped. The opposite ends or free ends of the bow arms 107 carry the bow stop 110, shown in the form of a bow roller. The bow stop 110 is generally formed of a resilient or cushioned material to prevent abrasions to the bow of a boat when engaging the stop.

In the embodiment illustrated, the roller of the bow stop 110 is positioned between the free ends of the bow arms 107 and is rotatable about an axis extending therebetween. The bow arms 107 are biased into a predetermined raised position against an arm stop 104 by means of a tension spring 109. The tension spring 109 is connected at one end to the winch base plate 106 and at its opposite end to a retaining plate 107a secured between the two bow arms 107 as by welding. The retaining plate 107a is carried by the bow arms 107 in a position such that when the bow arms 107 engage the arm stop 104, the spring retaining plate 107a is parallel to the bow stand base plate 101. The arm stop 104 is secured to the column 105 as by welding, and functions to limit the movement of the bow arms in a counterclockwise direction, as seen in FIG. 3, so that when a boat is loaded upon the trailer and against the bow stop 110, as seen in FIG. 3, the bow stop functions to prevent any further forward movement of the boat relative to the trailer.

Figure 2:
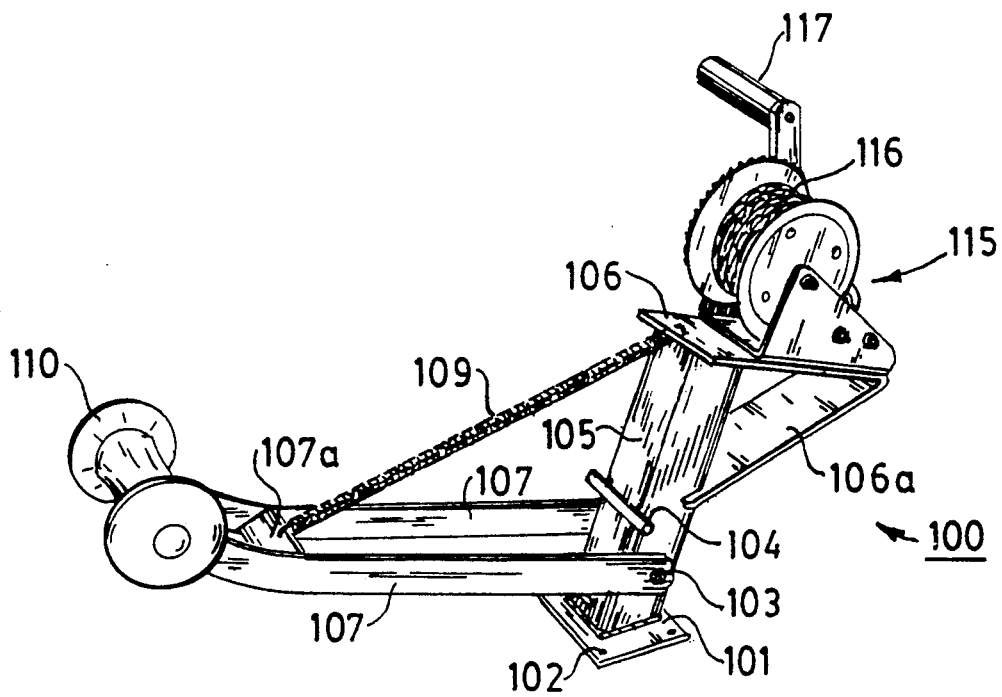
FIG. 2 is a perspective view of the bow stand illustrating the bow stop pivoted in a manner for movement with a boat to facilitate the unobstructed launching of a boat from a trailer.
Figure 4:
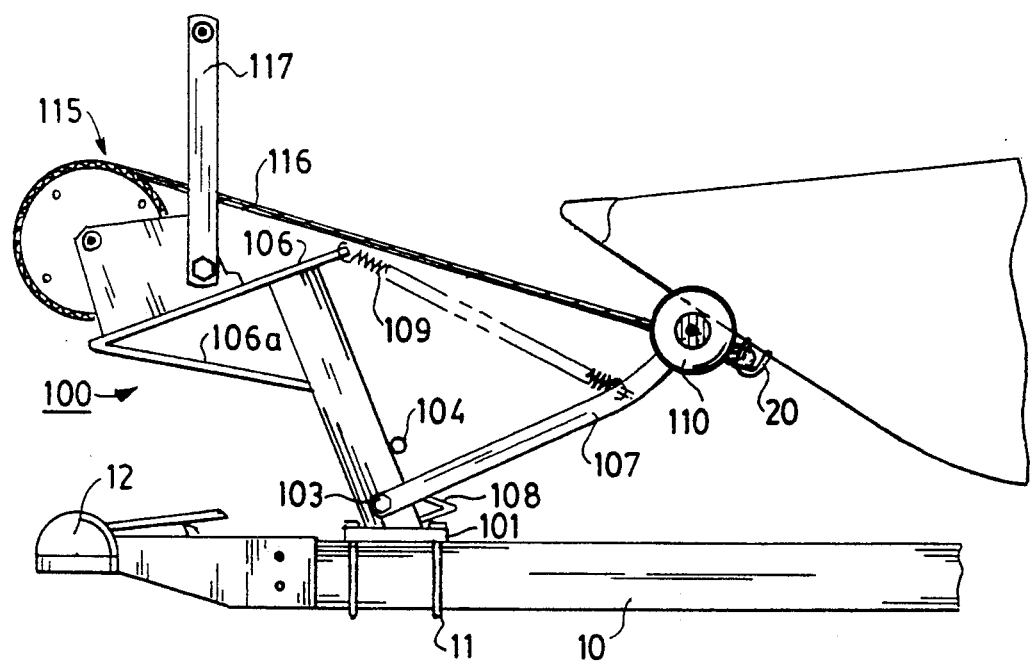
FIG. 4 is a side elevational view of the bow stand mounted on a trailer tongue with the bow stop pivoted by the movement of a boat during launching.

Referring now more specifically to FIGS. 2 and 4, the bow arms 107 are illustrated in a position wherein they have been pivoted out from contact with the stop 104 against the bias of the spring 109 as the boat is launched from the trailer. The pivotal connection of the bow arms 107, to the column 105, prevents the boat, or accessories mounted on the boat, from obstructing release of the boat due to contact with the bow stop 110. The pivotal connection 103 permits the bow arms 107 to deflect through an arc sufficient to enable the boat to be launched from the trailer, without causing any hang-up with the bow stop 110. This minimizes the potential for any damage, of the type which has heretofore occurred in the use of winch assemblies wherein the bow stop is held in a fixed position.

While this invention has been described with reference to a preferred embodiment, it will be understood by those skilled in the art that various changes may be made and equivalents may be substituted for elements thereof without departing from the invention. In addition, many modifications may be made to adapt a particular situation or material to the teachings of the invention without departing from the essential scope thereof. Therefore, it is intended that the invention not be limited to the particular embodiment disclosed in the specification and shown in the drawings as the best way presently known for carrying out this invention, but that the invention will include all embodiments falling within the scope of the appended claims.

What is claimed is:

1. A bow stand adapted to be carried by a tongue of a boat trailer, comprising
    a post member which includes a base means for securing the post member onto a tongue of a boat trailer and winch means carried by said post member for connecting to a boat;
    a bow arm assembly mounted for pivotal movement relative to said post member so that a free end of said bow arm assembly is movable relative to said post member between a raised and a lowered position;
    bow stop means carried at the free end of said bow arm assembly engagable by a bow of a boat carried on the boat trailer to move said bow arm assembly from said raised to said lowered position away from said post member in response to the movement of the bow of the boat away from said post member; and
    resilient means yieldably urging said bow arm assembly to said raised position such that said bow stop means provides a stop to limit forward movement of the boat carried on the trailer and is pivotable to said lowered position to facilitate removal of the boat from the trailer.

2. The bow stand of claim 1 wherein said bow arm assembly includes a pair of bow arm members mounted on a lower end of said post member, and with respective free ends thereof supporting said bow stop means.

3. The bow stand of claim 1 wherein said bow arm assembly includes a pair of substantially J-shaped bow arm members supporting said bow stop means.

4. The bow stand of claim 1 further including stop means carried by said post member to limit upward movement of said bow arm assembly.

5. The bow stand of claim 1 wherein said resilient means includes a tension spring having the ends thereof mounted respectively to an upper portion of said post member and adjacent the free end of said bow arm assembly.

6. The bow stand of claim 1 wherein said bow stop means includes a roller having a transverse axis for rotational movement relative to said bow arm assembly.

7. The bow stand of claim 1 further including a retaining means carried by a lower end of said post member for receiving a fastener to secure a boat thereto.

* * * * *